April 9, 1946. H. SILVER 2,398,160
SAFETY CLIP
Filed Sept. 22, 1943
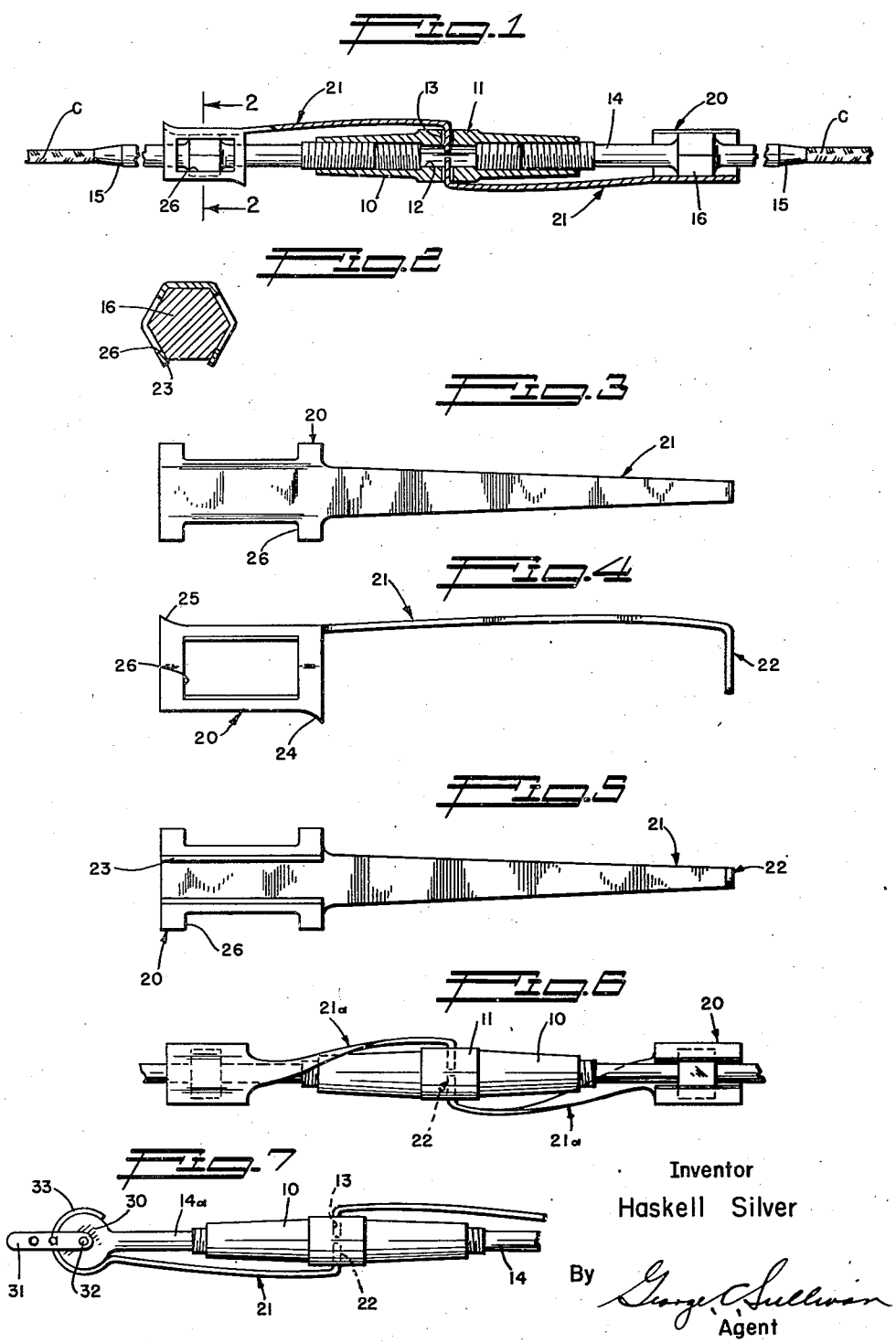
Inventor
Haskell Silver
By George C. Sullivan
Agent Patented Apr. 9, 1946

2,398,160

UNITED STATES PATENT OFFICE 2,398,160

SAFETY CLIP

Haskell Silver, Hollywood, Calif., assignor, by mesne assignments, to Lockheed Aircraft Corporation, a corporation of California Application September 22, 1943, Serial No. 503,371

7 Claims. (Cl. 287—60)

This invention relates to locking devices or clips, and relates more particularly to safety clips for turnbuckles. A general object of this invention is to provide simple, dependable and quickly installed safety clips of this character.

Large numbers of turnbuckles are employed in aircraft to adjust or tighten control cables, etc. The turnbuckles are permanently interposed in the cables and require adjustment from time to time to take up the cable slack. The standard Army and Navy turnbuckle comprises a tubular barrel, with a right hand thread in one end and a left hand thread in the other end, and bolts screwed into the ends of the barrel. The bolts are swaged or otherwise secured to the cables. The turnbuckle is adjusted by rotating the barrel with respect to the bolts and after such adjustment it becomes necessary to lock the barrel in the adjusted position. The usual practice has been to thread brass safety wire through a transverse opening in the barrel and through openings in the bolts. When this has been done the wiring is wrapped around the shanks of the bolts in such a manner that the ends of the wire are secured. The threading in and securing of the safety wire is a tedious, time-consuming operation particularly where the turnbuckles are difficult of access. Each time a turnbuckle requires adjustment, the safety wire must be cut off and when the adjustment has been completed a new safety wire must be installed. The safety wires are of brass or other soft metal and do not securely or positively lock the turnbuckle, but allow relative limited rotation between the barrel and bolts. The soft relatively small gauge wire is always subject to failure.

Another object of this invention is to provide safety clips for turnbuckles that may be easily and quickly installed to lock the turnbuckle in the adjusted condition and that may be readily released to permit adjustment of the turnbuckle. The clips of the invention may be installed in a fraction of the time needed for the installation of the usual safety wire and may be easily released and re-applied when the turnbuckle requires adjustment. The clips are adapted for repeated re-use whereas the brass safety wire must be cut off and discarded at each adjustment of the turnbuckle.

Another object of this invention is to provide clips for turnbuckles that are strong and positive, being operable to prevent all relative rotation between the barrel and bolts. There can be no play between the barrel and bolts of a turnbuckle locked by means of the clips of the invention and the locking strength developed by the clips is equal to or greater than that provided by the brass safety wire.

Another object of this invention is to provide safety clips of the character referred to that do not require any alteration in the turnbuckle or in the turnbuckle assembling or adjusting procedure. The clips of the invention may be easily and quickly installed on and removed from the regular turnbuckles and may be used on turnbuckles that have been previously locked by safety wires.

A further object of the invention is to provide safety clips of the character mentioned that are extremely simple and inexpensive, costing little or no more than the brass wire heretofore employed on turnbuckles. In installing the safety wire, the workman must estimate the length of wire required and he almost invariably cuts an excessively long piece of wire for the particular installation. The excess wire is, of course, waste. Further, at each adjustment of the turnbuckle a full length of safety wire must be cut off and discarded. The improved clips of the invention are simple, inexpensive one-piece elements that are capable of repeated re-use and their ultimate cost is less than the cost of the brass safety wire.

Other objects and features of this invention will become apparent from the following detailed description of typical preferred forms of the invention throughout which description reference may be had to the accompanying drawing in which:

Figure 1 is a side elevation of a cable turnbuckle with safety clips of the invention associated therewith with portions of the turnbuckle and clips appearing in longitudinal cross section;

Figure 2 is an enlarged transverse detailed sectional view taken as indicated by line 2—2 on Figure 1;

Figure 3 is an enlarged plan view of one of the clips;

Figure 4 is an enlarged side elevation of the clip;

Figure 5 is an enlarged bottom view of the clip;

Figure 6 is a side elevation of a turnbuckle equipped with another form of safety clip of the invention; and, Figure 7 is a side elevation of a turnbuckle of slightly different form with clips of the invention thereon.

The locking devices or safety clips of the invention may be designed for use on turnbuckles of different types and proportions. In the drawing I have illustrated the clips used on a turnbuckle of the character employed on the control cables of aircraft, it being understood that this is merely one example of use or application of the invention.

The turnbuckle includes an intermediate member or barrel 10. The barrel 10 is an elongate tubular part formed of brass, or the like. The intermediate portion 11 of the barrel 10 is thick-walled, and the surfaces of the barrel slope from this thick portion toward the barrel ends. The longitudinal opening 12 of the tubular barrel 10 is threaded from its opposite ends having a right-hand thread in one end portion and a lefthand thread in the other end portion. A transverse or diametric opening 13 is provided in the thick-walled middle portion 11 to intersect the opening 12. The safety wire generally employed to lock the turnbuckles is threaded through this transverse opening 13 and the opening is sometimes termed the "eye" of the turnbuckle barrel. The turnbuckle further includes what I will designate bolts 14. The bolts are formed of steel or the like and are threaded into the opposite ends of the barrel 10. The bolts 14 are quite long to extend a considerable distance beyond the barrel 10 and their outer ends are prepared for connection with the cables C. In the construction illustrated, the outer end portions 15 of the bolts 14 are tubular to receive the cables C and are adapted to be swaged on the cables. The bolts 14 have flat sided or polygonal portions 16 intended for engagement by wrenches to facilitate the adjustment or operation of the turnbuckle. The polygonal portions 16 are positioned to remain spaced from the barrel 10 with all possible adjustments of the turnbuckle. The wrench receiving portions 16 usually have eyes or transverse openings, and it has been the common practice to thread the safety wire through these openings and then wrap the wire around the shanks of the bolts. In accordance with the usual practice, the flat-sided portions 16 are hexagonal.

The safety clips of the invention may each be said to comprise a shell or sleeve 20 for engaging on a bolt 14, an arm 21 extending from the sleeve and a tip or finger 22 on the arm for engaging in the opening 13 of the barrel 10.

Each clip is an integral or one-piece unit formed of high carbon spring steel, or the like, of selected gauge. The sleeves 20 are formed or provided on what may be considered the outer ends of the clips. The shells or sleeves 20 are shaped and proportioned to fit around and conform to the polygonal portions 16 of the bolts to be positively held against rotation relative to the bolts. Where the bolt portions 16 are hexagonal, the sleeves 20 are likewise generally hexagonal in transverse cross section as best illustrated in Figure 2 of the drawing.

It is a feature of the invention that the sleeves 20 may be easily slipped over the cables C and then slid to positions on the polgonal bolt portions 16. Each sleeve 20 has a longitudinal slot 23 of sufficient width to freely receive or pass a cable C. In the particular construction illustrated the slot 23 of each sleeve 20 has a width substantially equal to one facet or side of the sleeve. In other instances the slot 23 may be somewhat narrower than its respective side of the sleeve. In applying or installing a clip its sleeve 20 is moved laterally toward a cable C so that the cable is received through the slot 23. The sleeve is then moved along the cable and the bolt 14 until the sleeve engages around the polygonal portion 16 of the bolt. To facilitate the engagement of the sleeve 20 on the polgonal bolt portion 16 the ends of the sleeve may be belled slightly at diagonally related corners 24 and 25 as shown in the lefthand side of Figure 1 and in Figure 4. The belled corners 24 and 25 allow the clip to be tilted slightly when being moved into position on the turnbuckle and thus make it easier to enter the finger 22 into the opening 13. The sleeves 20 of the clips are of substantial length to remain in full cooperation with the polygonal bolt portion 16 throughout the full range of adjustment of the turnbuckle. If desired, the sleeves 20 may have lightening openings 26 in their side walls. In other cases the walls of the sleeves 20 may be imperforate to give the sleeves greater strength. This is shown in Figure 6.

The arms 21 extend longitudinally from the sleeves 20 and as illustrated in Figure 1 of the drawing, are adapted to extend along the bolts and barrel 10 in adjacent relation thereto. The arms 21 are elongate parts whose inner ends merge with flat facets or sides of their respective sleeves 20. As illustrated in Figure 3 of the drawing, the arms 21 may be of outwardly diminishing width. The arms 21 are of substantial length to extend inwardly to the opening 13 when the sleeves 20 are correctly engaged on the polygonal portions 16 of the bolts 14. I have shown the arms 21 provided with a slight outward bow or curvature to increase their spring action and to facilitate the installation of the clips. The arms 21 are constructed to normally urge their respective fingers 22 inwardly into the opening 13 and to offer substantial resistance to disengagement of the fingers from the opening.

The fingers 22 are simple inturned extensions or tabs on the outer ends of the arms 21. In practice the fingers 22 extend at substantially right angles to the arms 21. The ends of the fingers 22 may be rounded off to better enter the opening 13. It is preferred to make the fingers 22 of sufficient length to remain engaged in the opening 13 even when the turnbuckle is subjected to heavy torque. As shown in Figure 1 of the drawing, the fingers 22 are of sufficient length to project into the central opening 12 of the barrel 10, it being understood that in some instances the fingers may be of such a length that their inner portions overlap.

The clips illustrated in Figure 6 of the drawing are the same as those illustrated in Figures 1 to 5 inclusive except that their arms 21ª are helically curved to "wrap around" the barrel 10. When the arms 21 are given the helical curvature they act under tension in substantially the same way as the conventional safety wire to resist relative rotation between the barrel 10 and the bolts 14. The curvature of the arms 21ª may be such that the arms rather closely engage about the barrel. It is to be understood that the two clips may be identical so that the arms 21ª pitch or curve in the directions to most effectively resist relative rotation between the turnbuckle barrel 10 and the bolts 14.

In employing the clips of the invention, the turnbuckle is adjusted in the usual way to give the cables C the required tension. When this has been done the sleeve 20 of a clip is passed on to a cable and the clip is moved toward the turnbuckle. The clip is positioned so that its finger 22 is aligned with one end of the opening 13 and this brings the clip to the rotative position where its polygonal sleeve 20 will engage over the polygonal bolt portion 16. As the clip is moved inwardly the rounded end of its finger 22 may ride along the sloping surface of the barrel 10 causing the arm 21 to be flexed outwardly, or the workman may grasp the arm 21 and flex it outwardly. The belled corners 24 and 25 of the sleeve 20 permit limited tilting of the clip with respect to the turnbuckle and the innermost bell 24 guides the sleeve onto the polygonal portion 16 of the bolt. The clip is moved inwardly until its finger 22 snaps into the opening 13. The flexed arm 21 continues to urge the finger inwardly to effectively resist disengagement of the finger from the opening. The second clip is installed in the same way but is positioned so that its finger 22 enters the other end of the opening 13. Figure 1 of the drawing clearly illustrates the operative positions of the two clips on the turnbuckle. The polygonal sleeves 20 engaged on the polygonal bolt portions 16 positively secure the clips against rotation relative to the bolts. The fingers 22 engaged in the opening 13 of the barrel 10 operate to prevent relative rotation between the bolts and the barrel. Thus the turnbuckle is securely locked in the adjusted position. Vibration of the cable and turnbuckle and torsional strains on the cable cannot produce relative rotation between the barrel and bolts, such relative rotation being prevented by the clips.

When it is desired to adjust the turnbuckle to take up slack in the cable or to give the cable additional slack, the arms 21 of the clips are sprung outwardly to disengage the fingers 22 from the opening 13 so that the clips may be slipped rearwardly and entirely disengaged from the turnbuckle and cables. Wrenches may be engaged on the polygonal portions 16 and the turnbuckle adjusted in the usual manner. The clips are then re-applied to the turnbuckle to again lock it in the adjusted position. In this connection it is to be observed that the clips are capable of repeated re-use. The use of the clips of the invention completely obviate the necessity for threading a safety wire through openings in the turnbuckle parts to lock the turnbuckle and avoids the necessity for cutting free such safety wire when it is desired to adjust the turnbuckle. There is a distinct saving in material because the clips are capable of repeated re-use and there is no safety wire to be cut and discarded with each adjustment of the turnbuckle. The long sleeves 20 of the clips adapt the clips for use throughout the entire range of adjustment of the turnbuckle.

In some locations on the aircraft one bolt of the turnbuckle is provided with an eye for connection with links. Thus as illustrated in Figure 7 of the drawing, the bolt 14a is formed at its outer end with an enlargement which I will term the eye 30. The peripheral surface of the eye 30 is curved or generally cylindrical while the ends or sides of the eye are generally flat. Links 31 are arranged at opposite sides of the eye 30 and are connected therewith by a bolt 32. The other bolt 14 of the turnbuckle may be the same as the bolts described above. The invention provides a safety clip for use with the eye bolt 14a. The safety clip is a one-piece element of spring steel or the like provided with an arm 21 and a finger 22 similar to or identical with above described arms 21 and fingers 22. An eye or partial loop 33 is provided on the outer end of the arm 21 and is designed to be engaged or snapped around the eye 30 of the bolt. It is preferred to have the loop 33 extend considerably more than 180° around the bolt eye 30 so that it cannot become accidentally displaced from the eye. The loop 33 is received between the links 31 which serve to hold it against lateral displacement. In employing the clip just described its loop 33 is engaged on the eye 30 and its finger 22 is engaged in the opening 13 of the barrel 10. The parts are formed and proportioned so that the arm 21 constantly urges the finger 22 into the opening 13 and effectively resists displacement of the finger. When it is desired to adjust the turnbuckle, the loop 33 is freed from the eye 30 to permit disengagement of the finger 22 from the opening 13. The clip illustrated in Figure 7 is positive and dependable in operation and is adapted for repeated re-use.

Having described only typical forms of the invention, I do not wish to be limited to the specific details herein set forth, but wish to reserve to myself any variations or modifications that may appear to those skilled in the art or fall within the scope of the following claims.

I claim:

1. A safety clip for a cable turnbuckle having a barrel and a bolt screwed therein for adjustment and having a polygonal portion, the clip including a split flat sided tubular part which is adapted to be passed laterally on to the cable and slid toward the turnbuckle for non-rotatable engagement on said polygonal portion, said part being adapted to engage more than 180° around said portion to be held against lateral movement in all directions thereby, and a spring arm on said part for engaging the barrel to prevent relative rotation between the barrel and bolt.

2. A safety clip for a turnbuckle having a barrel with a transverse opening and a bolt adjustably screw threaded into the barrel, and having a polygonal portion, the clip including a tubular polygonal part for engaging about said polygonal portion to be nonrotatable with respect to the bolt, an arm on said part and a finger on the arm for engaging in said opening to hold the barrel and bolt against relative rotation, said tubular part being flared at its inner end to readily pass onto said polygonal portion.

3. A safety clip for a cable turnbuckle having a barrel with a transverse opening and a bolt adjustably screw threaded into the barrel, and having a polygonal portion, the clip including a split polygonal sleeve adapted to be passed laterally onto the cable and slid onto said polygonal portion to be held against rotation thereby, a flexible resilient arm on the sleeve for extending longitudinally of the turnbuckle and a finger on the arm adapted to snap into said opening to prevent relative rotation between the barrel and bolt, the sleeve being of sufficient length to remain in rotation preventing engagement with said polygonal portion throughout the entire range of adjustment of the bolt.

4. A device for releasably locking a cable turnbuckle having a barrel with a transverse opening and a bolt on the cable threaded into the barrel and provided with a polygonal portion, the device including a split polygonal sleeve adapted to be passed onto the cable and slid along the bolt to nonrotatably engage on said polygonal portion, the sleeve being adapted to engage more than 180° around said polygonal portion to be held against radial movement in all directions thereby, a longitudinally extending arm on the sleeve, and a finger on the arm for entering said opening to lock the barrel and bolt against relative rotation.

5. A device for releasably locking a cable turnbuckle having a barrel with a transverse opening and a bolt on the cable threaded into the barrel, the device comprising a sleeve adapted for non-rotative engagement on the bolt and having a longitudinal split proportioned to receive the cable so that the sleeve may be readily arranged over the cable and slid onto the bolt, the sleeve having a circumferential extent of more than 180° to be restrained against radial movement in all directions when engaged on the bolt, a flexible resilient arm extending longitudinally from the sleeve, and a finger on the arm for entering said opening to lock the barrel and bolt against relative rotation.

6. A safety clip for a turnbuckle having a barrel with a transverse opening and a bolt adjustably screw threaded into the barrel, and having a polygonal portion, the clip including a tubular polygonal part for engaging about said polygonal portion to be non-rotatable with respect to the bolt, said tubular part being longer than said polygonal portion of the bolt to remain in cooperation therewith throughout the adjustment of the bolt, an arm on said part and a finger on the arm for engaging in said opening to hold the barrel and bolt against relative rotation, said part, arm and finger being integral.

7. Means for releasably locking a cable turnbuckle embodying a barrel with a transverse opening and bolts on the cable adjustably threaded into the ends of the barrel and having polygonal portions, said means comprising two clips each including a spring arm, a flat sided split tubular part on the outer end of the arm adapted to be passed laterally onto the cable and then slid onto a polygonal portion of a bolt to have non-rotative engagement therewith, and a finger on the inner end of the arm for engaging in said transverse opening, the clips being adapted to be arranged so that each clip has its said tubular part engaged on the polygonal portion of a bolt and so that the fingers of the clips enter the opposite ends of said transverse opening.

HASKELL SILVER.